J. BELLAMY.
TAILORS' APPARATUS FOR DRAFTING PATTERNS.
No. 169,402. Patented Nov. 2, 1875.
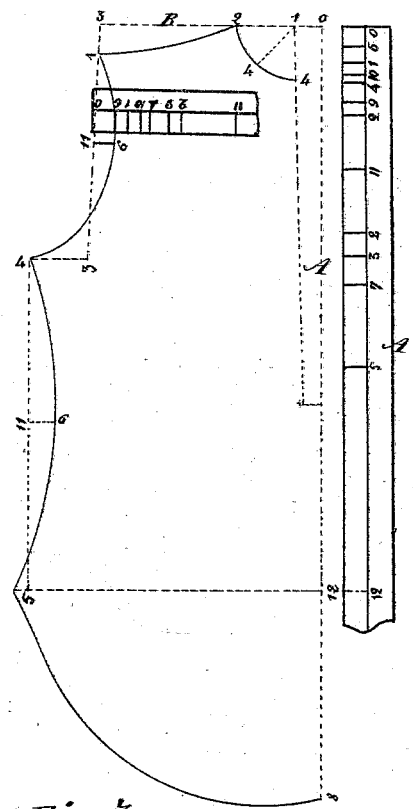
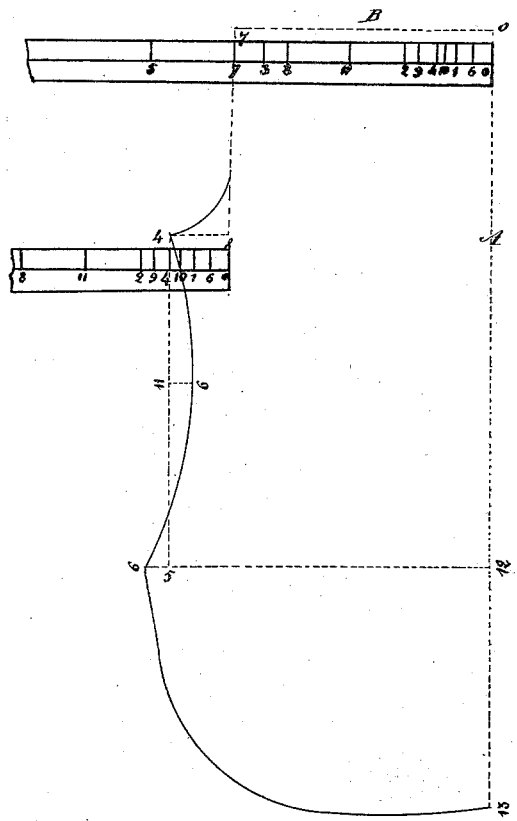
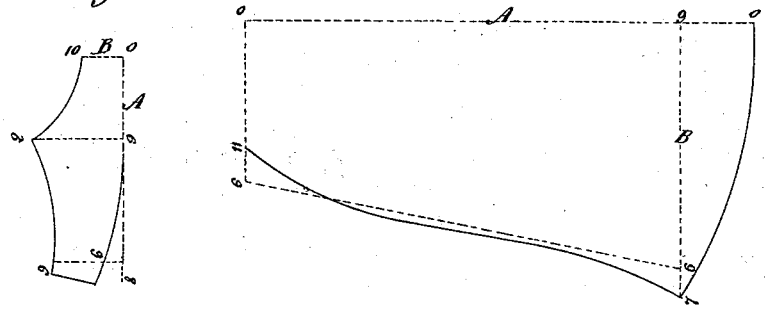
WITNESSES:
C. Neveux
A. F. Terry
INVENTOR:
John Bellamy
BY
[signature]
ATTORNEYS.

UNITED STATES PATENT OFFICE.

JOHN BELLAMY, OF NEW YORK, N. Y.

IMPROVEMENT IN TAILORS' APPARATUS FOR DRAFTING PATTERNS.

Specification forming part of Letters Patent No. 169,402, dated November 2, 1875; application filed July 10, 1875.

*To all whom it may concern:*

Be it known that I, JOHN BELLAMY, of the city, county, and State of New York, have invented a new and Improved Scale and Chart for Drafting Shirt-Patterns, of which the following is a specification:

The chart represents, in miniature, the forms of the different parts of the shirt, and the points to draw and cut to are numbered on all the parts to correspond with the actual measures on a scale of proper size for laying off the true measures on the cloth to be cut, a different scale being used for each different size or number of shirt.

Figure 1 is a diagram of the shirt-front. It also represents the scale, and shows the first position. Fig. 2 is a diagram of the back, and shows two other positions of the scale. Fig. 3 is a diagram of the sleeve, and Fig. 4 is a diagram of the yoke.

Similar letters of reference indicate corresponding parts.

A is the scale, which is divided irregularly, according to the different measures wanted, and marked from 0 to 12 in the following order: 0 6 1 10 4 9 2 11 8 3 7 5 12; and all the figures of the chart have the numbers indicating the distances or measures of the several parts located along the edges, to show at a glance the measure or number of the scale to be taken for the corresponding parts of the garment; for example, the lines A B being drawn, to begin with, the numbers 0, 1, 2, and 3, at the top of the chart, Fig. 1, tell what measures on the scale are to be taken for that part beginning with 0 at the angle of A B, and so on for the other edges, and the same for all the figures of the chart.

Having thus described my invention, I claim as new and desire to secure by Letters Patent—

The scale A, spaced and numbered, as described, in combination with the chart, having diagrams represented by Figs. 1, 2, 3, and 4 of the drawings, and the numbers marked thereon, substantially as specified.

JOHN BELLAMY.

Witnesses:
    T. B. MOSHER,
    ALEX. F. ROBERTS.